(12) United States Patent
Shin et al.

(10) Patent No.: US 7,475,287 B2
(45) Date of Patent: Jan. 6, 2009

(54) SYSTEM AND METHOD FOR REMOTELY CONTROLLING A DEBUGGING UNIT

(75) Inventors: Sang-Cheol Shin, Gyeonggi-Do (KR); Kyung-Hoon Kim, Seoul (KR); Jong-Cheol Jung, Seoul (KR); Young-Ho Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 459 days.

(21) Appl. No.: 11/286,968

(22) Filed: Nov. 22, 2005

(65) Prior Publication Data
US 2006/0129895 A1   Jun. 15, 2006

(30) Foreign Application Priority Data
Nov. 22, 2004   (KR) .................. 10-2004-0095934

(51) Int. Cl.
*G06F 11/00*   (2006.01)
(52) U.S. Cl. ..................... 714/27; 714/34; 714/38; 712/227
(58) Field of Classification Search .............. 714/34, 714/38, 27; 712/227
See application file for complete search history.

(56) References Cited

U.S. PATENT DOCUMENTS

| 6,320,875 | B2 | 11/2001 | Katseff |
| 2003/0041166 | A1 | 2/2003 | Williamson |
| 2003/0097592 | A1 | 5/2003 | Adusumilli |
| 2003/0101042 | A1 | 5/2003 | Ollive et al. |
| 2005/0071243 | A1* | 3/2005 | Somasekaran et al. ........ 705/26 |
| 2005/0193264 | A1* | 9/2005 | Khan et al. .................... 714/38 |
| 2006/0041788 | A1* | 2/2006 | Brock et al. ................... 714/34 |

FOREIGN PATENT DOCUMENTS

WO   WO 0025210 A   5/2000

OTHER PUBLICATIONS

Brown, C. et al., "Remote Service Methods for Cellular Communication Systems," Vehicular Technology Conference, 1995 IEEE 45th Chicago, Illinois, Jul. 25-28, 1995, New York, NY, IEEE, vol. 1, Jul. 25, 1995, , XP010166917.
Jander, M., "Welcome to the Revolution," Data Communications, McGraw Hill, New York, NY, vol. 25, No. 16, Nov. 21, 1996 , XP000633488.

* cited by examiner

*Primary Examiner*—Robert Beausoliel
*Assistant Examiner*—Charles Ehne
(74) *Attorney, Agent, or Firm*—Lee, Hong, Degerman, Kang & Waimey

(57) ABSTRACT

A system and method for remotely controlling a debugging unit, which can easily and accurately control the debugging unit in real time from a remote location regardless without data loss are disclosed. The system for remotely controlling a debugging unit comprises: a first protocol converter for converting a first or a second message between User Datagram Protocol (UDP) and Transmission Control Protocol (TCP), wherein the first message contains a debugging command and the second message contains debugging results; and a second protocol converter for converting a first or a second message between UDP and TCP.

23 Claims, 3 Drawing Sheets

SYSTEM AND METHOD FOR REMOTELY CONTROLLING A DEBUGGING UNIT

CROSS-REFERENCE TO RELATED APPLICATIONS

Pursuant to 35 U.S.C. § 119(a), this application claims the benefit of the Korean Patent Application No. 95934/2004, filed on Nov. 22, 2004, which is hereby incorporated by reference as if fully set forth herein.

FIELD OF THE INVENTION

The present invention relates to a debugging unit for a mobile terminal, and more particularly, to a system and method for remotely controlling a debugging unit.

BACKGROUND OF THE INVENTION

Recently, as the types of services for mobile terminals are varied, the size of the program code supporting a plurality of services is increased. Moreover, as the operation of a mobile terminal becomes more complicated, many of the mobile terminal operations cause conflicts with other operations resulting in terminal instability.

A mobile terminal designer stabilizes the operation of a mobile terminal by correcting errors of the terminal software using a debugging unit. The debugging unit identifies any terminal programming errors by checking the terminal program and data flow by using Joint Test Action Group (JTAG) Technologies.

The mobile terminal designer accesses the debugging unit by using a host computer to transmit a debugging command to the debugging unit. The host computer and the debugging unit are interconnected through a local area network (LAN) using User Datagram Protocol (UDP), and the host computer delivers a UDP message containing the debugging command to the debugging unit.

The debugging unit debugs the mobile terminal according to the debugging command within the UDP message, and then provides the debugging results to the host computer. According to the related art, the mobile terminal designer has to be located at the same position or same area as the mobile terminal when debugging the mobile terminal on a local network because the host computer and the debugging unit utilize UDP. The characteristic of the UDP is that though it is fast in protocol processing, it has no functions such as error correction or retransmission capabilities like Transmission Control Protocol (TCP). Thus, the UDP is used in multimedia applications requiring a high speed rather than reliability.

FIG. 1 is an exemplary view showing the configuration of a debugging unit for debugging a mobile terminal and of a computer for controlling the debugging unit in accordance with the prior art. As shown in FIG. 1, a mobile terminal 10 is physically connected to a debugging unit 20 using a dedicated debugging line.

The debugging unit 20 is connected to host computers 31 and 32 using UDP on a network. The debugging unit 20 receives a UDP message containing debugging commands from the host computers, and debugs the mobile terminal 10 by checking the program and data flow using JTAG Technologies according to the debugging command contained in the UDP message. The debugging unit 20 transmits the debugging results to the host computers 31 and 32 after debugging the mobile terminal 10.

The host computer 31 is able to transmit the UDP message containing the debugging command to the debugging unit 20 using UDP because it is connected to the debugging unit 20 through a LAN. Moreover, the host computer 31 receives the UDP message containing the debugging results from the debugging unit 20, and displays the debugging results.

The debugging unit 20 and each host computer 31 and 32 are connected by a LAN cable, and thus are located in the same area or on the same LAN.

Each of the host computers 31 and 32 is placed in a different position on a local network, each is connected to the debugging unit 20, each transmits a debugging command to the debugging unit 20 using UDP, and each displays the resulting data. Accordingly, although each of the host computers 31 and 32 can access the debugging unit 20, they cannot remotely control a debugging unit connected to another local network. The problem is that the host computers and debugging units have to be located in the same area, and the debugging units have to be controlled only through a local network.

Another problem is that control information and data sent and received between the host computers and the debugging units are lost due to the characteristics of the UDP, thus generating errors when debugging a mobile terminal.

SUMMARY OF THE INVENTION

Therefore, an object of the present invention is to provide a system and method for remotely controlling a debugging unit which can debug a mobile terminal in real time from a remote location regardless of the location of the mobile terminal by connecting the debugging unit and a host computer via the Internet.

It is another object of the present invention to provide a system and method for remotely controlling a debugging unit, which can reduce the loss of control information and data sent and received between the host computer and the debugging unit by interconnecting the debugging unit and a host computer via the Internet.

To accomplish the above objects, a system is provided for remotely controlling a debugging unit in accordance with the present invention, comprising: a first protocol converter for converting a first message received over the Internet and containing a debugging command from TCP to UDP; and a second protocol converter converting a second message received from the first protocol converter via the Internet and containing the debugging results from TCP to UDP.

To accomplish the above objects, another system is provided for remotely controlling a debugging unit in accordance with the present invention, comprising: a first protocol converter connected to a debugging module for debugging a mobile terminal, the first converter converts a first message received over the Internet from TCP to UDP and converts a second message forwarded from the debugging unit from UDP to TCP for transmission over the Internet; and a host computer connected to the first protocol converter using the Internet, the host computer converts the second message received from the first protocol converter from TCP to UDP, generates the first message and converts the first message from UDP to TCP for transmission over the Internet.

To accomplish the above objects, a method is provided for remotely controlling a debugging unit in accordance with the present invention, the method comprising the steps of: converting a first message generated by a host computer and containing a debugging command for controlling the debugging unit from UDP to TCP and for transmitting the first message to the debugging unit over the Internet; and converting the first message received by the debugging unit from TCP into UDP and debugging a mobile terminal connected to the debugging unit according to the debugging command within the first message.

To accomplish the above objects, a debugging unit is provided in accordance with the present invention, comprising a protocol converter converting a first message received over the Internet from TCP to UDP, wherein the first message contains a debugging command for debugging a mobile terminal.

To accomplish the above objects, a host computer is provided in accordance with the present invention, comprising a protocol converter converting a first message from UDP to TCP, wherein the protocol converter is connected over the Internet to a debugging unit for debugging a mobile terminal and contains a debugging command for controlling the mobile terminal.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The invention will be described in detail with reference to the following drawings in which like reference numerals refer to like elements, wherein.

DETAILED DESCRIPTION OF THE EMBODIMENTS

Hereinafter, a description will be made in detail with reference to FIGS. 2 to 4 with respect to one embodiment of a system and method for remotely controlling a debugging unit. The system and method can easily and accurately control the debugging unit 50 in real time from a remote location regardless of the location of a mobile terminal 40 without a data loss and without being restricted to one area. The system and method configures a protocol converter in a host computer and the debugging unit and connects the host computer and the debugging unit using the Internet.

Figure 1:
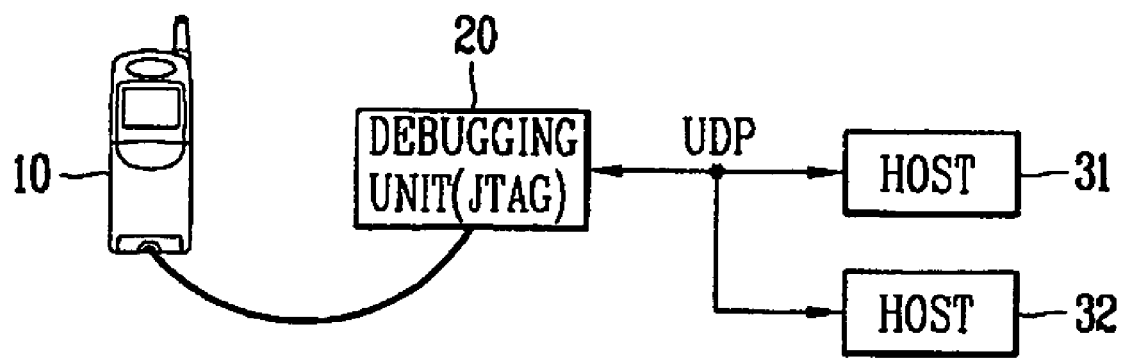
FIG. 1 is an exemplary view showing the configuration of a debugging unit for debugging a mobile terminal and of a host computer for controlling the debugging unit in accordance with the prior art.
Figure 2:
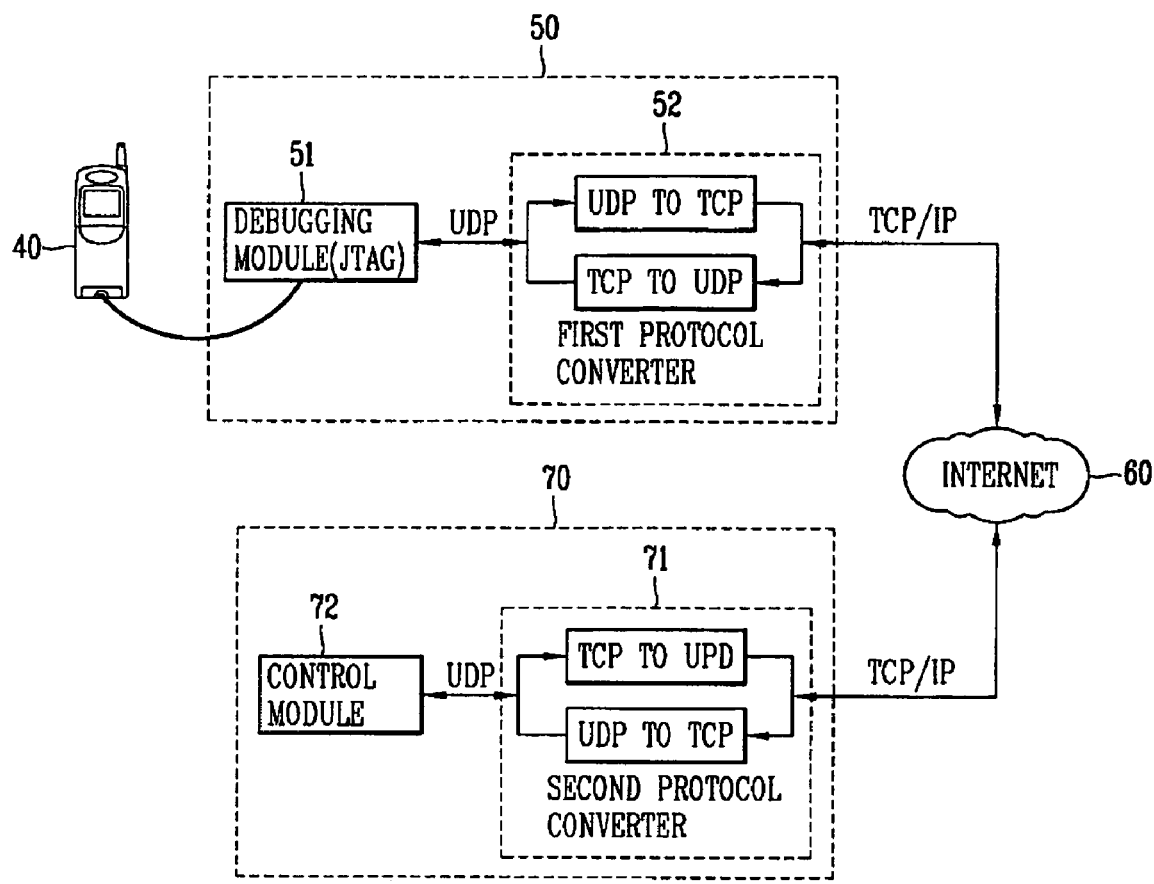
FIG. 2 is a block diagram showing the configuration of a system for remotely controlling a debugging unit in accordance with an embodiment of the present invention.

FIG. 2 is a block diagram showing the configuration of a system for remotely controlling a debugging unit in accordance with an embodiment of the present invention.

As shown in FIG. 2, the system for remotely controlling a debugging unit in accordance with the present invention comprises: a debugging unit 50 coupled to a mobile terminal 40, and the Internet 60; and a host computer 70 coupled to the Internet 60. The debugging unit 50 further comprises a debugging module 51 and a first protocol converter 52, wherein the first protocol converter 52 converts commands, data, and debugging results between UDP and TCP. The host computer 70 further comprises a control module 72 and a second protocol converter 71, wherein the second protocol converter 71 converts commands, data, and debugging results between UDP and TCP.

The mobile terminal 40 is connected to the debugging unit 50, the debugging unit 50 and the host computer 70 are connected to the Internet 60.

The control module 72 generates a first message containing a debugging command and displays the debugging results contained in a second message on a screen of the host computer 70. The second protocol converter 71 converts the first message containing the debugging command from UDP to TCP and then transmits the first message to the first protocol converter 52 via the Internet 60, or converts the second message containing the debugging results received from the first protocol converter 52 from TCP to UDP and then forwards the second message to the control module 72 for display.

The debugging module 51 debugs the mobile terminal 40 by checking the program and data flow of the mobile terminal 40 using the Joint Test Action Group (JTAG) Technologies according to the debugging command contained in the first message. The debugging module 51 generates the second message containing the debugging results from the mobile terminal. The first protocol converter 52 converts the second message generated by the debugging module 51 from UDP to TCP and transmits the second message to the host computer 70 over the Internet 60. The first protocol converter 52 also converts first message received from the host computer 70 from TCP to UDP and then forwards the first message to the debugging module 51.

Hereinafter, the operation of the system for remotely controlling a debugging unit will be described in detail.

First, the mobile terminal 40 may be connected to the debugging unit 50 via a dedicated debugging line.

The host computer 70 is connected to the debugging unit 50 using the internet 60, generates a first message containing a debugging command from UDP to TCP, and transmits the first message to the debugging unit 50. For example, the control module 72 within the host computer 70 generates a debugging command according to a user's instruction, and forwards a first message containing the generated debugging command to the second protocol converter 71.

The second protocol converter 71 within the host computer 70 converts the first message from the control module 72 from UDP to TCP, and transmits the first message to the first protocol converter 52 of the debugging unit 50 over the internet 60.

The debugging unit 50 is connected to the host computer 70 using the Internet 60, converts the first message containing the debugging command from TCP to UDP, and debugs the mobile terminal 40 according to the debugging command within the first message.

The debugging module 51 debugs the mobile terminal 40 by checking the mobile terminal 40 program and data flow using the JTAG Technologies according to the debugging command contained in the first message.

The debugging module 51 then generates a second message containing data resulting from debugging the mobile terminal 40 according to the debugging command, and forwards the second message to the first protocol converter 52.

The first protocol converter 52 converts the second message received from the debugging module 51 from UDP to TCP, and transmits the second message to the second protocol converter 71 over the Internet 60. The Internet 60 is a worldwide computer network, which prevents information loss by transmitting information in more than one direction or path using a TCP/IP protocol.

The second protocol converter 71 converts the second message received from the first protocol converter 52 from TCP to UDP, and forwards the second message to the control module 72.

The control module 72 receives the second message from the second protocol converter 71, and displays the debugging results contained in the second message on the screen of the host computer 70.

Consequently, in the present invention, as the host computer 70 is connected to the debugging unit 50 over the Internet, the debugging unit 50 can be controlled from a remote location regardless of the location of the mobile terminal 40 without data loss and without being restricted to any location. The mobile terminal 40 is connected to the debugging unit 50 can be accurately and easily debugged from a remote location.

Figure 3:
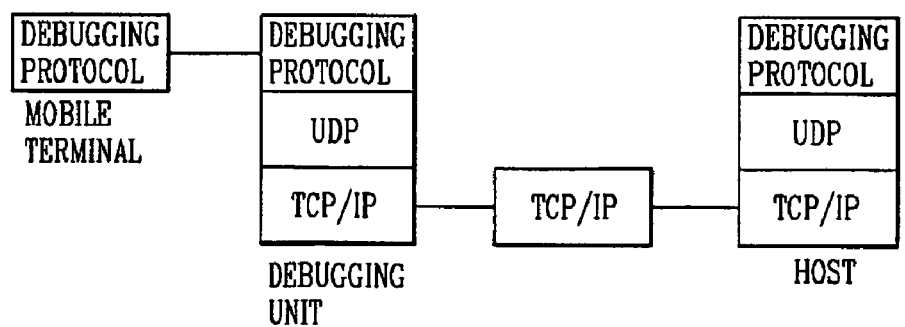
FIG. 3 is an exemplary view showing the protocol connection configuration of a mobile terminal, a debugging unit, the internet and a host computer of FIG. 2.

FIG. 3 is an exemplary view showing the protocol connection configuration of a mobile terminal, a debugging unit, the Internet and a host computer of FIG. 2.

The debugging protocol sends and receives debugging commands and the debugging results from the mobile terminal 40, the debugging unit 50 and the host computer 70. The UDP protocol sends and receives debugging commands and the debugging results from the debugging unit 50 and the host computer 70. The TCP/IP protocol sends and receives debugging commands and the debugging results from the debugging unit 50, the Internet 60 and the host computer 70.

A debugging protocol layer within the host computer 70 transmits the debugging command of the host computer 70 to a UDP protocol layer. The UDP protocol layer transmits the debugging command of the debugging protocol to a TCP/IP protocol layer, and transmits the debugging results of the debugging unit 50 to the debugging protocol layer. The TCP/IP protocol layer transmits the debugging command of the UDP protocol layer to the debugging unit 50 through the TCP/IP protocol layer of the Internet, and transmits the debugging results of the TCP/IP protocol layer to the UDP protocol layer.

The TCP/IP protocol layer within the debugging unit 50 sends and receives the debugging command of the host computer and the debugging results of the debugging unit 50 by data communication with the TCP/IP protocol layer of the Internet. The UDP protocol layer within the debugging unit 50 transmits the debugging command of the TCP/IP protocol layer to the debugging protocol layer, and transmits the debugging results of the debugging protocol layer to the TCP/IP protocol layer. The debugging protocol layer transmits the debugging results, obtained by transmitting the debugging command of the UDP protocol layer to the mobile terminal 40, to the UDP protocol layer.

Figure 4:
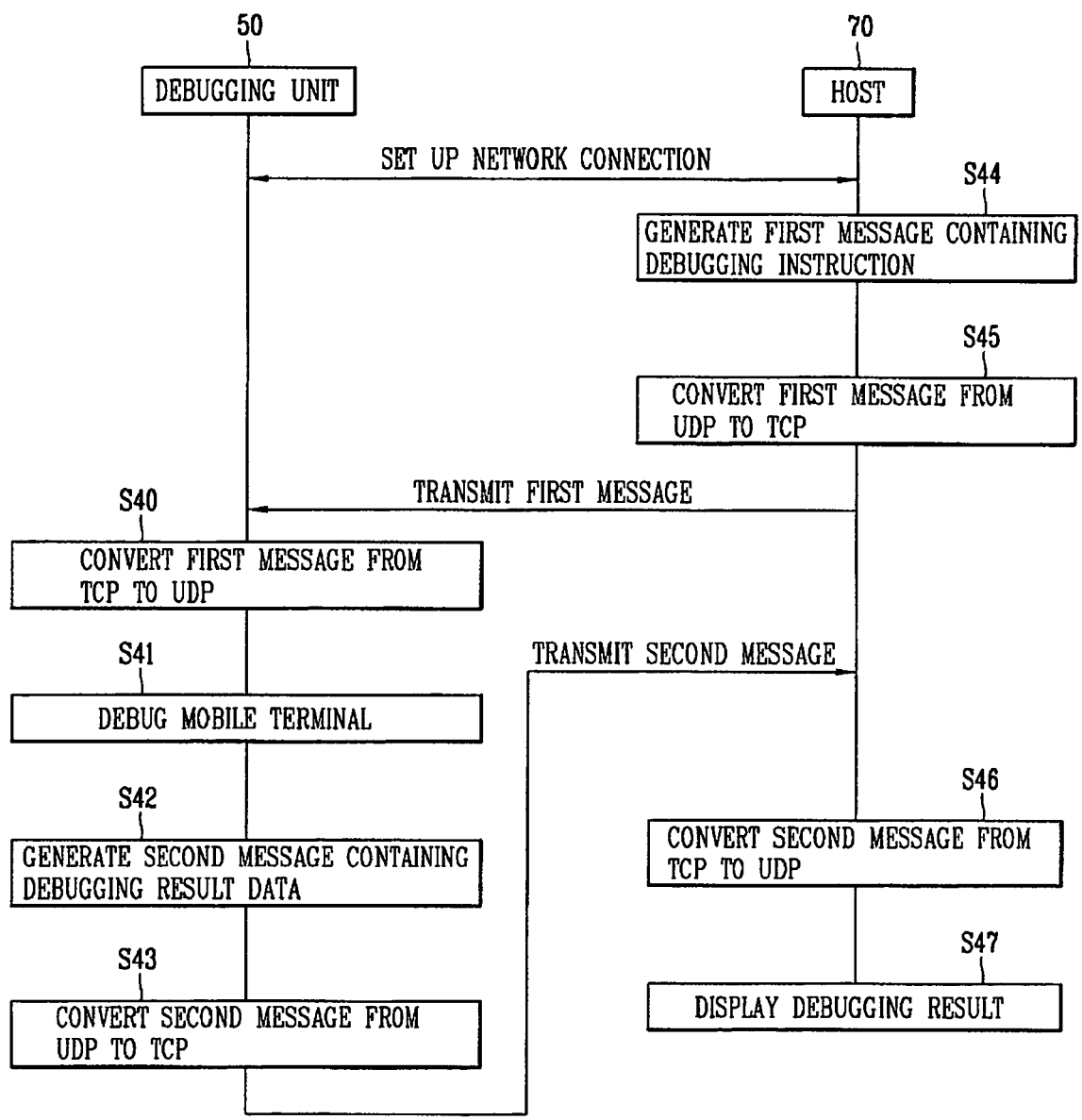
FIG. 4 is an operational flow chart showing a method for remotely controlling a debugging unit in accordance with an embodiment of the present invention.

FIG. 4 is a operational flow chart showing a method for remotely controlling a debugging unit in accordance with an embodiment of the present invention.

As shown in FIG. 4, the method for remotely controlling a debugging unit in accordance with the embodiment comprises the steps of: setting up a network connection between a debugging unit 50 and a host computer 70 through TCP/IP protocol by entering the IP of the debugging unit 50 through the host computer 70; generating a first message containing a debugging command for controlling the operation of the debugging unit 50 through the host computer 70 (S44); converting the first message from UDP to TCP (S45) and transmitting the first message to the debugging unit 50 over the Internet 60; converting the first message from TCP to UDP (S40); debugging a mobile terminal 40 according to a debugging command contained in the converted first message through the debugging unit 50 (S41); generating a second message containing the debugging results (S42); converting the second message from UDP to TCP (S43); transmitting the second message to the host computer 70 over the Internet; converting the second message received over the Internet 60 from TCP to UDP (S46); and displaying the debugging results contained in the second message on the screen of the host computer 70 (S47).

The method for remotely controlling a debugging unit in accordance with the embodiment of the present invention will be described with reference to FIG.4, wherein the host computer 70 is located at a distance from the mobile terminal 40 and the debugging unit 50, and the user debugs the mobile terminal 40 through the debugging unit 50 by using the host computer 70.

First, the host computer 70 sets up a network connection by entering the IP of the debugging unit 50 and attempting a TCP/IP connection with the debugging unit 50.

The host computer 70 generates a first message containing a debugging command for controlling the operation of the debugging unit 50 in order to debug the mobile terminal 40 according to the user's debugging request (S44), and converts the first message from UDP to TCP (S45). The host computer 70 transmits the first messsage to the debugging unit 50 over the Internet 60.

The debugging unit 50 receives the first message from the Internet 60 and converts the first message from TCP to UDP (S40), debugs the mobile terminal 40 according to the debugging command contained in the first message (S41), and then generates a second message containing the debugging results (S42).

The debugging unit 50 converts the second message containing the debugging results from UDP to TCP (S43), and transmits the second message to the host computer 70 over the Internet 60. Here, the debugging results are contained in the second message, and the second message is converted from UDP to TCP.

The host computer 70 receives the second message from the Internet 60 and converts the second message into the from TCP to UDP (S46), and retrieves the debugging results within the second message and displays the debugging results on the screen (S47).

As described above in detail, the system and method for controlling a debugging unit in accordance with the present invention have the effect of controlling the debugging unit 50 from a remote location regardless of the location of the mobile terminal 40 without a data loss and without being restricted to one area by connecting the host computer 70 to the debugging unit 50 through a TCP/IP protocol. Accordingly, the mobile terminal 40 connected to the debugging unit 50 can be easily and accurately debugged in real time from a remote location.

We claim:

1. A system for remotely debugging a mobile device, the system comprising:
   a debugging unit,
   a host computer; and
   a network connecting the debugging unit and the host computer, wherein the host computer generates a first message in a first protocol containing debugging commands and transmits the first message in a second protocol, and wherein the debugging unit generates a second message in the first protocol containing debugging results and transmits the second message in the second protocol, wherein the debugging unit further comprises a first protocol converter connected to the network, and a debugging module coupled with the first protocol converter and the device, and wherein the debugging module debugs the device by checking program and data flow of the device using Joint Test Action Group (JTAG) Technologies according to debugging commands contained in the first message.

2. The system of claim 1, wherein the host computer further comprises a second protocol converter connected to the network, and a control module coupled with the second protocol converter.

3. The system of claim 2, wherein the control module generates the first message containing debugging commands and forwards the first message to the second protocol converter, and wherein the second protocol converter converts the first message from the first protocol to the second protocol and transmits the first message to the debugging unit over the network.

4. The system of claim 3, wherein the second protocol converter receives the second message containing the debugging results from the debugging unit over the network, converts the second message from the second protocol to the first protocol, and forwards the second message to the control module, wherein the control module displays the debugging results.

5. The system of claim 3, wherein the first protocol is User Datagram Protocol (UDP).

6. The system of claim 3, wherein the second protocol is Transmission Control Protocol (TCP).

7. The system of claim 1, wherein the first protocol converter receives the first message containing debugging instructions from the host computer over the network, converts the first message from the second protocol to the first protocol, and forwards the first message to the debugging module, wherein the debugging module debugs the mobile device responsive to the debugging instructions.

8. The system of claim 7, wherein the debugging module generates the second message containing the debugging results, forwards the second message to the first protocol converter, wherein the first protocol converter converts the second message from the first protocol to the second protocol and transmits the second message to the host computer over the network.

9. The system of claim 7, wherein the first protocol is User Datagram Protocol (UDP).

10. The system of claim 7, wherein the second protocol is Transmission Control Protocol (TCP).

11. The system of claim 1, wherein the network is the Internet.

12. The system of claim 1, wherein the mobile device is a mobile terminal.

13. A method for remotely debugging a mobile device, the method comprising the steps of:
  establishing a network connection between a debugging unit and a host computer;
  generating a first message containing debugging instructions in the host computer in a first protocol;
  transmitting the first message from the host computer to the debugging unit over the network in a second protocol;
  receiving the first message in the debugging unit;
  debugging the device by checking program and data flow of the device using Joint Test Action Group (JTAG) Technologies according to debugging instructions contained in the first message;
  generating a second message containing the debugging results in the debugging unit in the first protocol;
  transmitting the second message from the debugging unit to the host computer over the network in the second protocol;
  receiving the second message in the host computer; and
  displaying the debugging results from the second message on the host computer thereby viewing the results of the debugging instructions.

14. The method of claim 13, wherein the step of generating the first message further comprises converting the first message from a first protocol to a second protocol.

15. The method of claim 14, wherein the step of receiving the first message further comprises converting the first message from the second protocol to the first protocol and debugging the mobile device responsive to the debugging instructions.

16. The method of claim 14, wherein the step of generating the second message further comprises converting the second message from the first protocol to the second protocol.

17. The method of claim 14, wherein the step of receiving the second message further comprises converting the second message from the second protocol to the first protocol.

18. The method of claim 14, wherein the debugging unit comprises:
  a means for debugging responsive to debugging instructions contained in the first message and for generating the second message containing the debugging results;
  a second means for converting the first message from the second protocol to the first protocol, and for converting the second message form the first protocol to the second protocol; and
  a means for transmitting the second message to the network and for receiving the first message from the network.

19. The method of claim 14, wherein the host computer comprises:
  a means for generating the first message containing debugging instructions and for displaying the debugging results contained in the second message;
  a first means for converting the first message from the first protocol to the second protocol, and for converting the second message form the second protocol to the first protocol; and
  a means for transmitting the first message to the network and for receiving the second message from the network.

20. The method of claim 19, wherein the mobile device is a mobile terminal.

21. The method of claim 14 wherein the network is the Internet.

22. The method of claim 13, wherein the first protocol is User Datagram Protocol (UDP).

23. The system of claim 13, wherein the second protocol is Transmission Control Protocol (TCP).

* * * * *